United States Patent [19]

Turner et al.

[11] 4,117,926
[45] Oct. 3, 1978

[54] PROBE COVER

[75] Inventors: Robert Bruce Turner, Weymouth, Mass.; Glen Lee Weinberg, Berkley Heights, N.J.

[73] Assignee: Johnson & Johnson, New Brunswick, N.J.

[21] Appl. No.: 758,893

[22] Filed: Jan. 12, 1977

[51] Int. Cl.$^2$ ............................................. G01K 1/16
[52] U.S. Cl. .................................. 206/306; 73/343 B; 136/232; 220/66
[58] Field of Search .......... 206/306; 73/343 R, 343 B, 73/362 AR; 338/28, 29, 30; 220/307, 66; 136/232

[56] References Cited
U.S. PATENT DOCUMENTS

| | | | |
|---|---|---|---|
| 3,485,436 | 12/1969 | Mirasol, Jr. | 220/307 |
| 3,532,372 | 10/1970 | Stroud | 220/307 |
| 3,738,479 | 6/1973 | Sato | 206/306 |
| 3,929,018 | 12/1975 | Turner | 206/306 |

*Primary Examiner*—William Price
*Assistant Examiner*—Joseph M. Moy

[57] ABSTRACT

A protective cover which may be used with a sensor probe component of an electronic thermometer is provided having an improved design for a structure comprising two components of dissimilar materials. An elongate shaft or sleeve member preferably of plastic material may have a metallic cap member forming a closural end thereof. The metal cap may have a flange extending outwardly therefrom. This flange extension may traverse backwardly away from the shaft. Plastic material from the shaft is formed about the backward traverse of the cap flange to form an interlocked encasement of the two dissimilar components.

4 Claims, 2 Drawing Figures

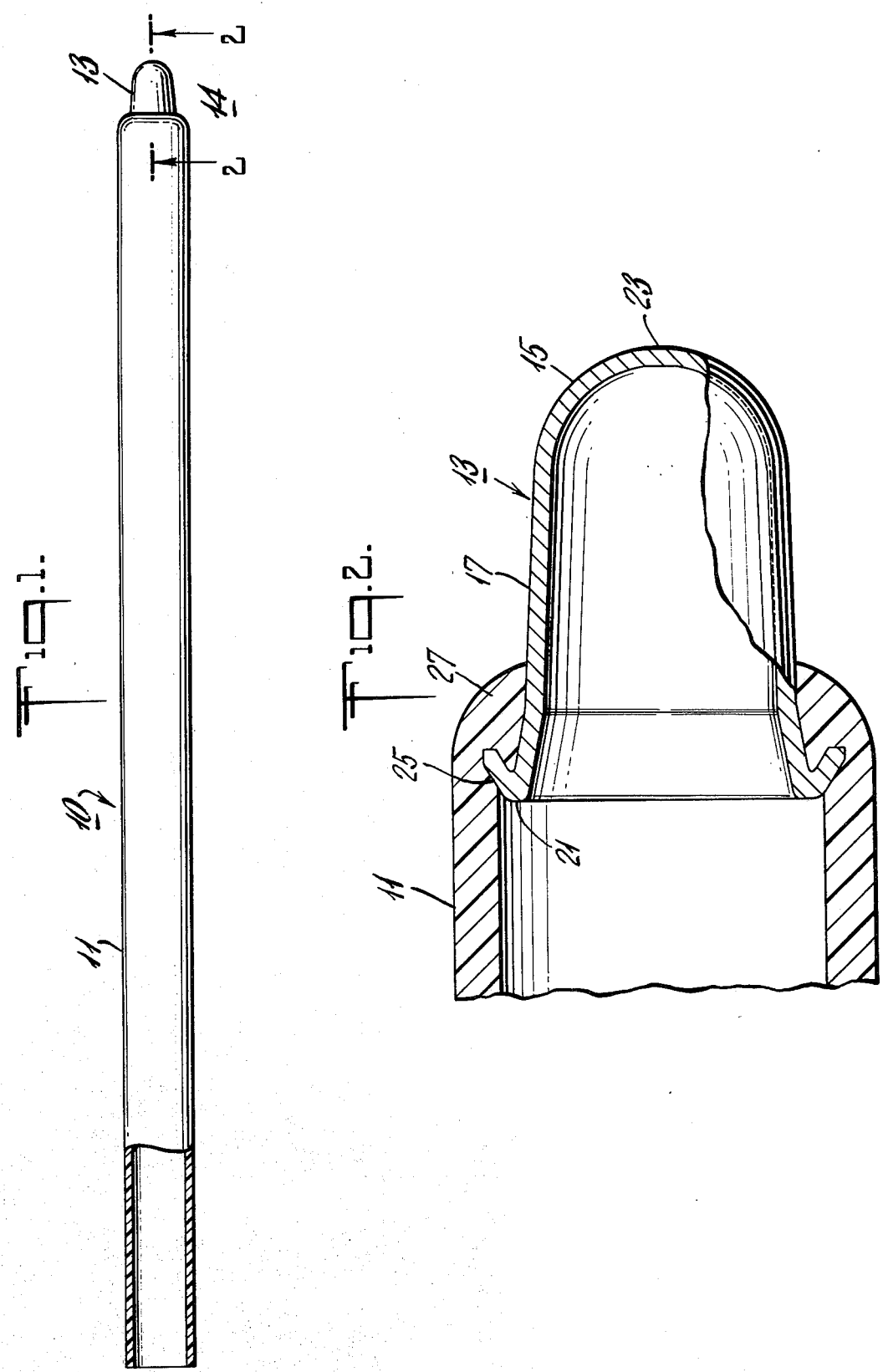

PROBE COVER

BACKGROUND OF THE INVENTION

Electronic thermometers have become useful tools in both human and veterinary medicine. These thermometers usually include a probe member which is inserted into a patient for taking temperatures. This probe member has been designed to be a permanent component of the electronic system making up the thermometer.

Many of these thermometer probes are now being used with disposable probe covers. The purpose of these probe covers is to bacteriologically isolate the probe from the patient while providing a thermal path for body temperature to be sensed by the probe. The use of a disposable probe cover readily facilitates the availability of a sanitary probe and probe cover for use on each new patient while eliminating the necessity for sterilizing the probe after each use.

Probe covers have been designed to conform to the shape of the probe with which they are used. For the most part probe shafts are cylindrically shaped, and as such, probe covers have cylindrical configurations. These cylindrical configurations may include either straight walls or tapered walls or walls which taper to varying diameters through various sections.

For many applications, it is quite desirable to have a probe cover of rigid or semi-rigid material. Such a probe cover is usually constructed of a thermoplastic substance. These thermoplastic probe covers provide sufficiently rigid structures to protect the delicate probe components of the electronic thermometer while maintaining sufficient flexibility to accommodate patient comfort.

Some thermoplastic probe covers of this type have had a metal tip forming the sensing end thereof and providing an enhanced thermal path for body heat to pass to the electronic thermometer probe within. Such probe covers are taught by U.S. Pat. No. 3,929,018, U.S. Pat. No. 3,738,479, and U.S. Pat. No. Des. 218,851. A problem with these prior art probe covers, however, is that the metal tip may, given the right circumstances, part from the thermoplastic shaft when in use. If this occurs while the probe and cover are in a patient, the tip is left in the patient, creating a hazard. If a metal tip "pops-off" the thermoplastic shaft of the cover while not in the patient, it could spring out as a projectile and create an additional hazard. An improved metal-tipped probe cover where the metal tip cannot pop-off is desirable.

An objective of this invention is to provide a metal-tipped thermoplastic electronic thermometer probe cover with the tip securely attached to a thermoplastic shaft.

A second objective is to provide such a probe cover wherein the metal tip is securely locked to the thermoplastic shaft material and wherein the tip cannot pull away from the thermoplastic shaft.

An even further objective is to provide such a probe cover wherein the metal tip is interlocked into the thermoplastic shaft material.

SUMMARY OF THE INVENTION

The objectives of this invention are achieved in an improved probe cover for an electronic thermometer which is constructed of two components of dissimilar materials; a thermoplastic shaft or sleeve member and a metal tip member. The shaft member may be of cylindrical structure and of thermoplastic material having a hollow interior and two openings thereinto.

The metal tip member may form a closure for one open end. This metal tip member may be of a shape to conform to the cross-sectional shape of the thermoplastic shaft or to provide a comfortable interface with a temperature sensing site and may extend outwardly beyond the shaft material. With the shaft preferably of a cylindrical structure, the tip will preferably be of cup-shaped structure and may be positioned to extend outwardly beyond the thermoplastic shaft. This cup-shaped metal tip may have a flange extending outwardly completely about the lip thereof. The extension of this flange may continue outwardly and backwardly toward the base of the cup away from the thermoplastic shaft, to form a backward curl member having a directional vector component parallel to the longitudinal axis of the shaft walls.

The tip may be secured and locked to the thermoplastic shaft by an interlocking of the shaft material about the curled-back flange member. This structure therefore provides an interlocking joining of the two dissimilar parts which precludes the parting of the tip member from the shaft member in an outwardly direction, away from the shaft member material, without the breaking away of thermoplastic material from the shaft structure.

DESCRIPTION OF THE DRAWINGS

The novel features, advantages and other aspects of the invention may best be understood from the following description taken in connection with the accompanying drawings in which like characters refer to like parts, and in which;

FIG. 1 presents a plan view of the probe cover featuring the longitudinal dimension of the cover and showing a partial cutaway of the shaft member.

FIG. 2 is a sensor tip-end sectional view taken as indicated in FIG. 1, showing a partial cutaway of this tip end.

DETAILED DESCRIPTION OF THE INVENTION

An improved design is provided for probe covers used with electronic thermometer probes and the like wherein a probe cover is constructed of two dissimilar materials.

This probe cover 10 may very often have the configuration shown in FIG. 1. An elongate thermoplastic shaft 11 forms the body portion of the cover 10. This shaft 11 is cylindrically shaped having a hollow cylindrical interior with openings thereinto at either end and thus can act as a sleeve. This sleeve or shaft 11 is made from a high density polyethylene material such as Monsanto type 6003. As a matter of manufacturing convenience a shaft 11 may be cut from a continuous length of tubing by parting off perpendicular to the longitudinal axis. By so doing a sleeve 11 of the following approximate dimensions may be utilized: length 3.25 inches, outside diameter 0.150 inches, wall thickness 0.020 inches and inside diameter 0.110 inches.

Forming the closure for one end of the sleeve 11 is an end cap or tip 13. In position, this tip 13 which can have an elongate structure forms the sensing end 14 of the cover 10. The tip 13 is made of 0.008 inch thick aluminum sheeting which has been stamped to shape.

FIG. 2 shows the sensing end 14 of the probe cover 10 and is a partial cut-away sectional view of that end 14.

The tip 13 has a cup-shaped symmetrical configuration being a die stamping with a full radiused bottom 15, as well as side walls 19 and a lip 21. The tip 13 is approximately 0.175 inches deep from lip 21 to bottom 15.

The full radius bottom 15 has a radius of about 0.045 inches. A flat portion 23 having a diameter of about 0.010 inches exists in the bottom 15 about the longitudinal axis of the tip 13. The flat 23 provides a mechanical surface which facilitates the insertion of the tip 13 into the sleeve 11 during manufacture. This flat 23 also provides a good heat transfer surface needed during insertion.

The side walls 17 taper outwardly at an angle of 1½° from the longitudinal axis of the tip 13 as they extend from the radiused bottom 15 towards the lip 21. From a point approximately 0.040 inches from the lip 21 to the rim of the lip 21 this taper is 5°. The inside diameter of the tip 13 at the lip 21-defined opening is approximately 0.095 inches.

This increased taper of 5° is important when using an aluminum tip 13. Aluminum is a readily available and easily formed material. It can be immersed into the body environment for short periods of time without deteriorating or sloughing-off material. However, when used with the probe taught by U.S. Pat. No. 3,929,018 where a line contact is needed between a probe cover tip 13 and the probe itself, a substantial amount of force is exerted against the tip 13 by the probe. This probe usually has a glass encased thermistor mounted on the end of a stainless steel shaft. These are very hard materials with respect to aluminum.

Some taper angle is needed between the tip 13 inner walls and the end of a probe to provide a line contact therebetween. At small angles of 1° or 2° taper the aluminum tip will deform. A taper angle of 5° or more is needed to provide sufficient rigidity against the radial and longitudinal force components applied by the end of the probe. This critical angle of 5° however will vary with the tip material.

A reverse flange 25 portion extends outwardly from the lip 21. This flange 25 has an annular configuration as it extends completely about the lip 21 and backwardly towards the radiused bottom 15 about the walls 19. This flange 25 configuration comprises a radially extending vector component traversing outwardly from said lip 21 and a longitudinally extending vector component traversing parallel to the longitudinal axis of the tip 13. The extension of the flange 25 from the lip 21 is at an approximate 60° angle with a perpendicular to the longitudinal axis of the tip 13. The excursion of the flange 25 includes a vector component parallel to the longitudinal axis of the shaft 11. The outside diameter of the flange 25 is approximately 0.135 inches. Moreover, the flange 25 is formed by aluminum material being continuous with the material of the lip 21. The flange 25, the lip 21 and the walls 17 describe a "fish-hook" like configuration when viewed in cross-section as shown in FIG. 2.

Thermoplastic polyethylene material of the shaft 11 walls is formed completely about a portion of the outside of the walls 17 of the tip 13 as well as completely encasing the reverse flange 25.

With this structure, the tip 13 is securely locked into the shaft 11. There is an interlocking between the end portion 27 of the walls of the shaft 11 with the reverse flange 25 which makes it unlikely that the tip 13 could slip, pop or otherwise be ejected outwardly from the shaft 11 structure. For the tip 13 to pull away part of the shaft 11 polyethylene wall section 27 would have to break away.

Moreover, since the flange 25 extension is at an angle of 30° from the longitudinal and its excursion is a distance of somewhat less than 0.020 inches into the shaft 11 walls, a force upon the tip 13 into the shaft 11 would create a compressive force by the flange 25 surfaces upon the walls of the shaft 11 thus holding the tip 13 securely in place from any movement into the shaft 11.

Besides providing a securely interlocked shaft 11-tip 13 structure, the present invention facilitates an economical, fast and effective manufacturing process. Most of the prior art metal-tip plastic-shaft probe covers were made by injection molding. Such an injection molding process is expensive and troublesome from the standpoint of mold flash, air entrapment and mold release.

With the present invention, the tip 13 may be inserted into an end of the shaft 11 and the shaft 11 material 27 formed about the tip 13 flange 25 in a stamping operation.

The backward extension angle of the flange 25 forms a taper surface for spreading the walls of the shaft 11 during tip 13 insertion. For this purpose the outer surface of the flange 25 may be straight so as to create a wedge or incline plane action upon the shaft 11 walls. Speed and ease of tip 13 insertion is therefore greatly enhanced over prior art designs. The "wedge" action of the flange 25 upon the shaft 11 walls facilitates, when necessary, cold insertion.

Once the tip 13 is inserted within the shaft 11 a desired distance, the outward pressure of the relatively oversized flange 25 outside diameter against the inside walls of the relatively undersized shaft 11 inside diameter will hold the tip 13 and shaft 11 in position during the stamping operation.

The stamping die leaves the shaft 11 end material 27 with a radiused end as shown in FIG. 2.

It is advantageous to render the outer edges of the flange 25 free of sharp corners and burs which extend in the longitudinal direction. This will minimize stress concentration points when force is exerted on the tip 13 in a longitudinal direction.

Modifications and changes could be made in the above-described probe cover and many different embodiments of this invention could be made without departing from the scope thereof. The shaft 11, for example, could have a tapered configuration which would provide a reduction of cross-section either continually or discontinually by means of shoulders. Moreover, the cross-sectional shape of both the shaft 11 and the tip 13 could be changed to include many other geometric configurations which would be suited for a comfortable interface with the temperature measuring site. For example, the tip 13 could be rectangular with a completely flat end. Moreover, the sleeve 11, and tip 13 need not be limited to thermoplastic and aluminum materials, respectively. Any materials compatible with the temperature measuring environment may be used. It is intended, therefore, that all matter contained in the above description or shown in the accompanying drawings be interpreted as illustrative and not in the limiting sence.

What is claimed is:

1. An electronic thermometer probe cover apparatus, comprising:
   an elongate sleeve member having surfaces defining a hollow interior along a longitudinal axis, said sleeve member being configured generally to receive an electronic thermometer probe;

a tip member attached to and closing one end of said sleeve member, in position for thermal engagement with said probe, said tip member being generally axially symmetric about said axis, generally cup shaped at an outermost terminus, thence extending away from said terminus along said axis toward said one end of said sleeve member, the interior surfaces of said extension away from said terminus and along said axis being in at least two successive integral segments, said first segment tapering away from said axis at a first angle and said segment tapering away from said axis at a second angle larger than said first angle, said tip member thence defining a protruding flange which engages and is surrounded by said sleeve member.

2. Apparatus as described in claim 1 wherein said tip member is composed of aluminum, and said second angle of repose is at least 5°.

3. Apparatus as described in claim 2 wherein said first angle is about 1½°.

4. Apparatus as described in claim 1 wherein said flange extends circumferentially outwardly from said axis and is directed at least partially back toward said cup shaped terminus.

* * * * *